(12) United States Patent
Chin et al.

(10) Patent No.: US 8,699,194 B2
(45) Date of Patent: Apr. 15, 2014

(54) SHUNT PROTECTION MODULE AND METHOD FOR SERIES CONNECTED DEVICES

(75) Inventors: Chi-Yuan Chin, Hsinchu (TW); Kuei-Jyun Chen, Hsinchu (TW)

(73) Assignee: Silicon Touch Technology Inc., Hsinchu (TW)

( * ) Notice: Subject to any disclaimer, the term of this patent is extended or adjusted under 35 U.S.C. 154(b) by 174 days.

(21) Appl. No.: 13/241,814

(22) Filed: Sep. 23, 2011

(65) Prior Publication Data
US 2013/0077202 A1    Mar. 28, 2013

(51) Int. Cl.
*H02H 9/04* (2006.01)

(52) U.S. Cl.
USPC ...................................................... 361/91.5

(58) Field of Classification Search
USPC ...................................................... 361/91.5
See application file for complete search history.

(56) References Cited

U.S. PATENT DOCUMENTS

| | | | |
|---|---|---|---|
| 6,153,980 A | 11/2000 | Marshall et al. | |
| 7,564,666 B2 | 7/2009 | Ball et al. | |
| 7,994,725 B2* | 8/2011 | Bouchard | 315/122 |
| 8,283,870 B2* | 10/2012 | Ger et al. | 315/125 |
| 8,410,705 B2* | 4/2013 | Bollmann et al. | 315/119 |
| 2005/0018726 A1* | 1/2005 | Dinger et al. | 372/38.09 |
| 2007/0108843 A1* | 5/2007 | Preston et al. | 307/112 |
| 2007/0159750 A1* | 7/2007 | Peker et al. | 361/93.1 |
| 2010/0109557 A1 | 5/2010 | Bouchard | |
| 2010/0109570 A1* | 5/2010 | Weaver | 315/295 |
| 2010/0123399 A1 | 5/2010 | Bollmann et al. | |
| 2010/0156298 A1* | 6/2010 | Takacs et al. | 315/90 |

FOREIGN PATENT DOCUMENTS

| | | |
|---|---|---|
| CN | 201663727U U | 12/2010 |
| DE | 10358447 B3 | 5/2005 |
| DE | 102006056712 A1 | 6/2008 |
| EP | 0955619 A1 | 11/1999 |
| JP | 2010524777 A | 7/2010 |
| WO | WO-2009138907 A2 | 11/2009 |

OTHER PUBLICATIONS

European search report, Feb. 27, 2012.

* cited by examiner

*Primary Examiner* — Scott Bauer
(74) *Attorney, Agent, or Firm* — Rabin & Berdo, P.C.

(57) ABSTRACT

A shunt protection module and method for series connected devices use multiple shunt semiconductors and a control unit. The shunt semiconductors correspond respectively to multiple target devices. Each shunt semiconductor connects to a corresponding target device in parallel. The control unit connects to trigger terminals of the shunt semiconductors. Because each shunt semiconductor has a characteristic that with the higher voltage the trigger terminal is input, the lower the electrical potential difference between shunt terminals is, and the control unit outputs a trigger voltage that is equal to the electrical potential difference on at least two adjacent target devices to the shunt semiconductor corresponding to a failed target device, an electrical potential difference on the shunt semiconductor is low when it operates. The shunt protection module and method ensure providing high trigger voltage to the shunt semiconductor corresponding to the failed target device.

10 Claims, 8 Drawing Sheets

SHUNT PROTECTION MODULE AND METHOD FOR SERIES CONNECTED DEVICES

BACKGROUND OF THE INVENTION

1. Field of the Invention

The present invention relates to a shunt protection module and method for series connected devices, and more particularly to a shunt protection module and method that have low power dissipation.

2. Description of Related Art

A conventional shunt protection apparatus is invented to ensure that series connected devices, such as multiple series connected LEDs, operate normally even if one of the series connected LEDs fails. However, designing a shunt protection apparatus that has low power dissipation is an important issue to be solved. U.S. Pat. No. 7,564,666 (related prior art hereinafter) disclosed a solution.

With reference to FIG. 7, the related prior art disclosed a shunt protection circuit. Each shunt protection circuit corresponds to and is connected to a LED and has a first terminal 51, a second terminal 52, a metal oxide semiconductor (MOS) gated silicon controlled rectifier (SCR) 53, two diodes 54, 55 and a resistor 56. The first terminal 51 is connected to an anode of the corresponding LED, and the second terminal 52 is connected to the cathode of the corresponding LED. A drain terminal of the MOS gated SCR 53 is connected to the first terminal 51, and a source terminal of the MOS gated SCR 53 is connected to the second terminal 52. The two diodes 54, 55 are back to back connected together. A cathode of one of the two diodes 54 is connected to the first terminal 51, and a cathode of the other diode 55 is connected to a gate terminal of the MOS gated SCR 53. The resistor 56 is connected between the gate terminal of the MOS gated SCR 53 and the second terminal 52.

The above-mentioned shunt protection circuit does not work when the corresponding LED operates normally so the shunt protection circuit conducts substantially zero current. When the corresponding LED fails and the failure of the corresponding LED results in an open circuit in the loop of the series connected LEDs, the MOS gated SCR 53 in the shunt protection circuit will turn on to shunt the current through the MOS gated SCR 53. Therefore, the series connected LEDs with one failed LED remain operating normally.

FIG. 8 shows another example disclosed in the related prior art. A zener diode 57 is applied to be the shunt protection circuit. A cathode of the zener diode 57 is connected to the first terminal 51, and an anode of the zener diode 57 is connected to the second terminal 52. The zener diode 57 conducts substantially zero current when the corresponding LED operates normally. When the corresponding LED fails and the failure of the corresponding LED results in an open circuit in the loop of the series connected LEDs, the zener diode 57 will conduct to shunt the current through the zener diode 57. Therefore, the series connected LEDs with one failed LED remain operating normally.

According to column 6 in the specification of the related prior art, a maximum power dissipation of the MOS gated SCR 53 or the zener diode 57 is a quarter of the power dissipation of the corresponding LED when the MOS gated SCR 53 turns on or the zener diode 57 conducts. For example, if a 350-milliampere (mA) current flows through the corresponding LED and a forward voltage of the LED is 3.5 volts when the corresponding LED operates normally, a power dissipation of the corresponding LED is about 1.2 watts so the maximum power dissipation of the MOS gated SCR 53 or the zener diode 57 is about 0.3 watts when the corresponding LED fails.

However, the power dissipation of the shunt protection apparatus disclosed in the related prior art cannot be lower than a quarter of the power dissipation of the corresponding LED. The reason is that an electrical potential difference between the gate and source terminals of the MOS gated SCR 53 has to be greater than a threshold voltage to switch the MOS gated SCR 53 to turn on. Based on the connections of the MOS gated SCR 53 shown in FIG. 7, however, an electrical potential difference between the drain and source terminals of the MOS gated SCR 53 will never be lower than the electrical potential difference between the gate and source terminals. Therefore, although the related prior art disclosed that the power dissipation of the MOS gated SCR 53 or the zener diode 57 preferably is no greater than about one tenth the power dissipation of the corresponding LED, it is practically difficult to be achieved by the invention disclosed in the related prior art.

To overcome the shortcomings, the present invention provides a shunt protection module and method that have low power dissipation to mitigate or obviate the aforementioned problems.

SUMMARY OF THE INVENTION

The main objective of the invention is to provide a shunt protection module and method that have low power dissipation.

The shunt protection module and method for series connected devices use multiple shunt semiconductors and a control unit. The shunt semiconductors correspond respectively to multiple target devices. Each shunt semiconductor connects to a corresponding target device in parallel. The control unit connects to trigger terminals of the shunt semiconductors. Because each shunt semiconductor has a characteristic that with the higher voltage the trigger terminal is input, the lower the electrical potential difference between shunt terminals is, and the control unit outputs a trigger voltage that is equal to the electrical potential difference on at least two adjacent target devices to the shunt semiconductor corresponding to a failed target device, an electrical potential difference on the shunt semiconductor is low when it operates. The shunt protection module and method ensure providing high trigger voltage to the shunt semiconductor corresponding to the failed target device so the power dissipation of the shunt protection module of the present invention can be reduced as low as possible and lower than the conventional shunt protection apparatuses thereof.

Other objectives, advantages and novel features of the invention will become more apparent from the following detailed description when taken in conjunction with the accompanying drawings.

DETAILED DESCRIPTION OF PREFERRED EMBODIMENT

A shunt protection module in accordance with the present invention is used to connect to multiple target devices and comprises multiple shunt semiconductors and a control unit.

Figure 1:
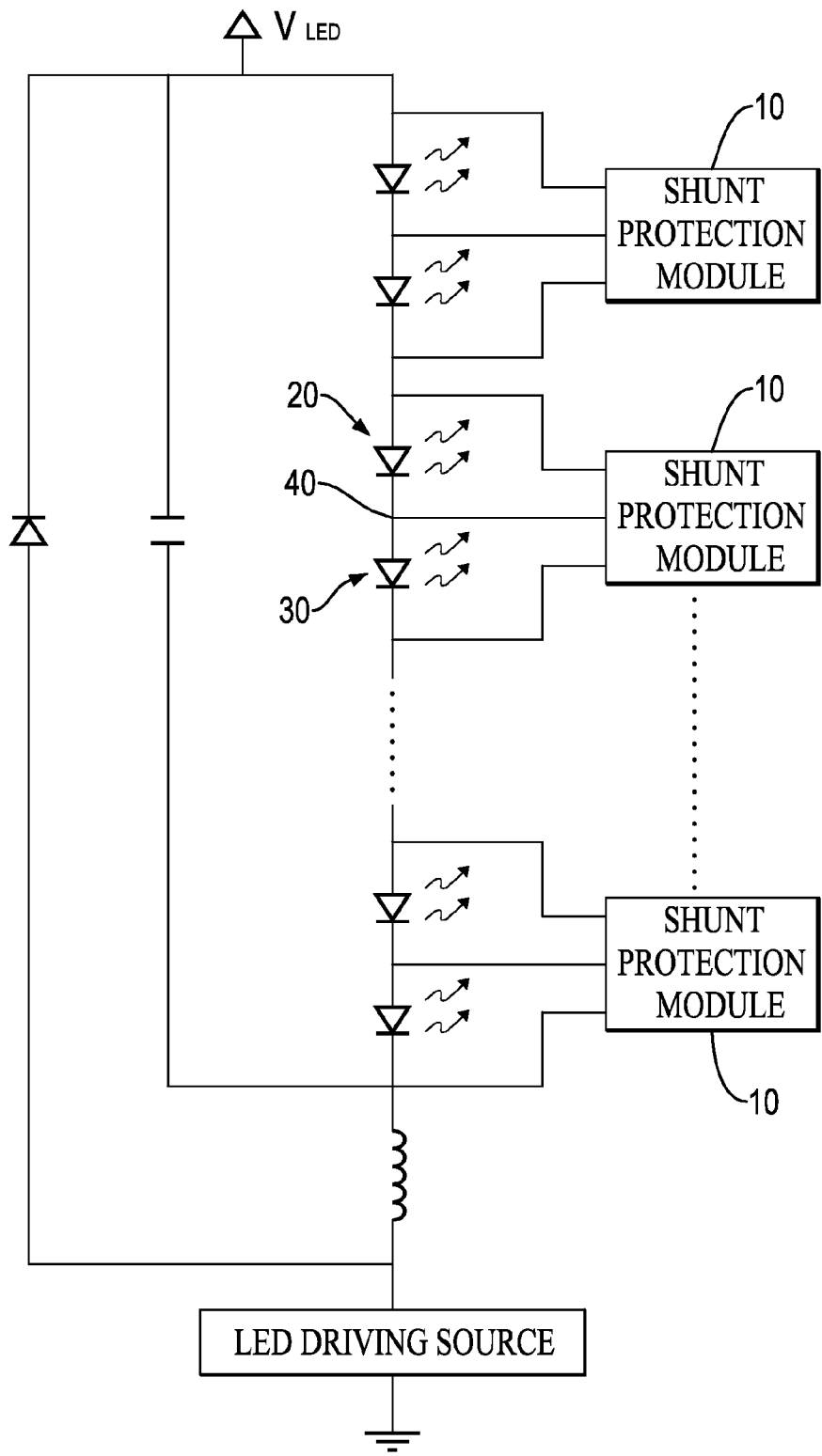
FIG. 1 is a functional block diagram of an embodiment of a shunt protection module in accordance with the present invention connecting to two LEDs in a string of series connected LEDs.

With reference to FIG. 1, an embodiment of the shunt protection module 10 of the present invention is applied to, but not limit to, an LED string, which includes multiple LEDs connected in series. Each shunt protection module connects to multiple adjacent target devices, such as connecting to two adjacent LEDs in the LED string in this embodiment. The two adjacent LEDs are exemplified as a first LED 20 and a second LED 30 hereinafter. An anode of the second LED 30 connects to a cathode of the first LED 20 in a node 40.

Figure 2:
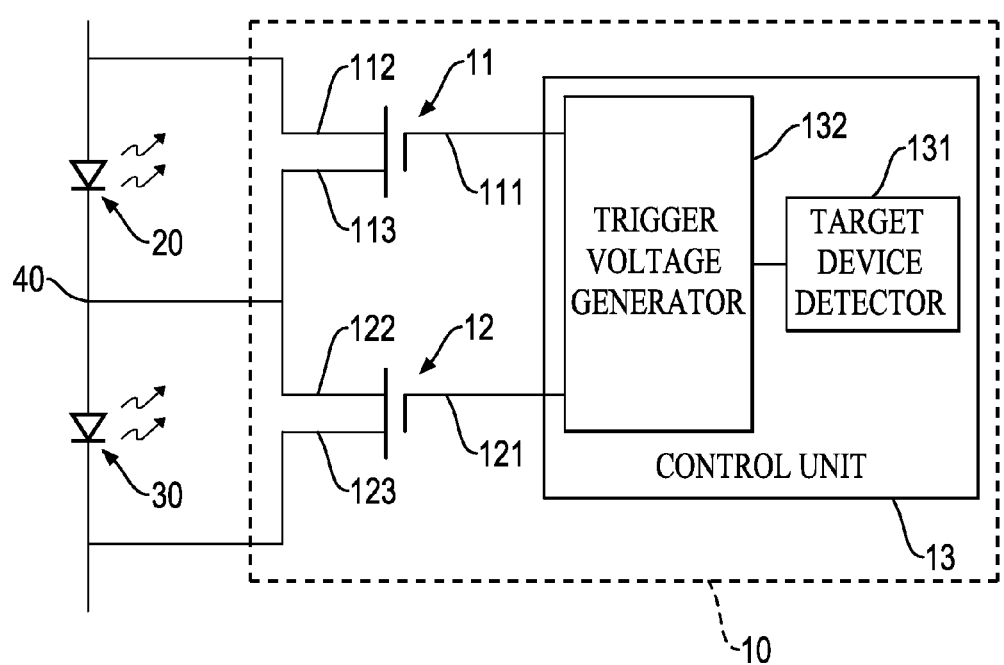
FIG. 2 is a functional block diagram of the shunt protection module shown in FIG. 1.

The amount of the shunt semiconductors corresponds to the amount of the target devices. With further reference to FIG. 2, two shunt semiconductors, which are a first shunt semiconductor 11 and a second shunt semiconductor 12, are implemented in this embodiment and correspond respectively to the first LED 20 and the second LED 30. If the shunt protection module connects to three or four adjacent LEDs, three or four shunt semiconductors are implemented in the shunt protection module and correspond respectively to the three or four adjacent LEDs.

The first shunt semiconductor 11 corresponds to the first LED 20 and has a trigger terminal 111 and two shunt terminals 112, 113. The shunt terminals 112, 113 of the first shunt semiconductor 11 connect respectively to the anode of the first LED 20 and the node 40 so the first shunt semiconductor 11 connects to the first LED 20 in parallel. Further, the first shunt semiconductor 11 has a characteristic that with the higher voltage the trigger terminal 111 is input, the lower the electrical potential difference between the shunt terminals 112, 113 is. The first shunt semiconductor 11 may be a metal oxide semiconductor (MOS), and the trigger terminal 111 is a gate terminal of the MOS and the shunt terminals 112, 113 respectively are a drain terminal and a source terminal of the MOS.

The second shunt semiconductor 12 corresponds to the second LED 30 and has a trigger terminal 121 and two shunt terminals 122, 123. The shunt terminals 122, 123 of the second shunt semiconductor 12 connect respectively to the node 40 and the cathode of the second LED 30 so the second shunt semiconductor 12 connects to the second LED 30 in parallel. Also, the second shunt semiconductor 12 has a characteristic that with the higher voltage the trigger terminal 121 is input, the lower the electrical potential difference between the shunt terminals 122, 123 is. The second shunt semiconductor 12 may be a MOS, and the trigger terminal 121 is a gate terminal of the MOS and the shunt terminals 122, 123 respectively are a drain terminal and a source terminal of the MOS.

The control unit 13 connects to the trigger terminals 111, 121 of the first and the second shunt semiconductors 11, 12 and detects whether the first or the second LED 20, 30 fails. The control unit 13 also outputs a trigger voltage to the trigger terminal 111, 121 of the shunt semiconductor 11, 12 corresponding to the failed LED 20, 30 so the shunt semiconductor 11, 12 corresponding to the failed LED 20, 30 is switched to turn on. The trigger voltage is equal to an electrical potential difference on at least two adjacent target devices. In the embodiment shown in FIGS. 1 and 2, the trigger voltage is equal to an electrical potential difference between the anode of the first LED 20 and the cathode of the second LED 30.

With further reference to FIG. 2, the control unit 13 may comprise a target device detector 131 and a trigger voltage generator 132.

The target device detector 131 detects whether either the first LED 20 or the second LED 30 fails.

The trigger voltage generator 132 connects to the target device detector 131 and the trigger terminals 111, 121 of the first and the second semiconductors 11, 12. The trigger voltage generator 132 is capable of outputting the trigger voltage.

Figure 3:
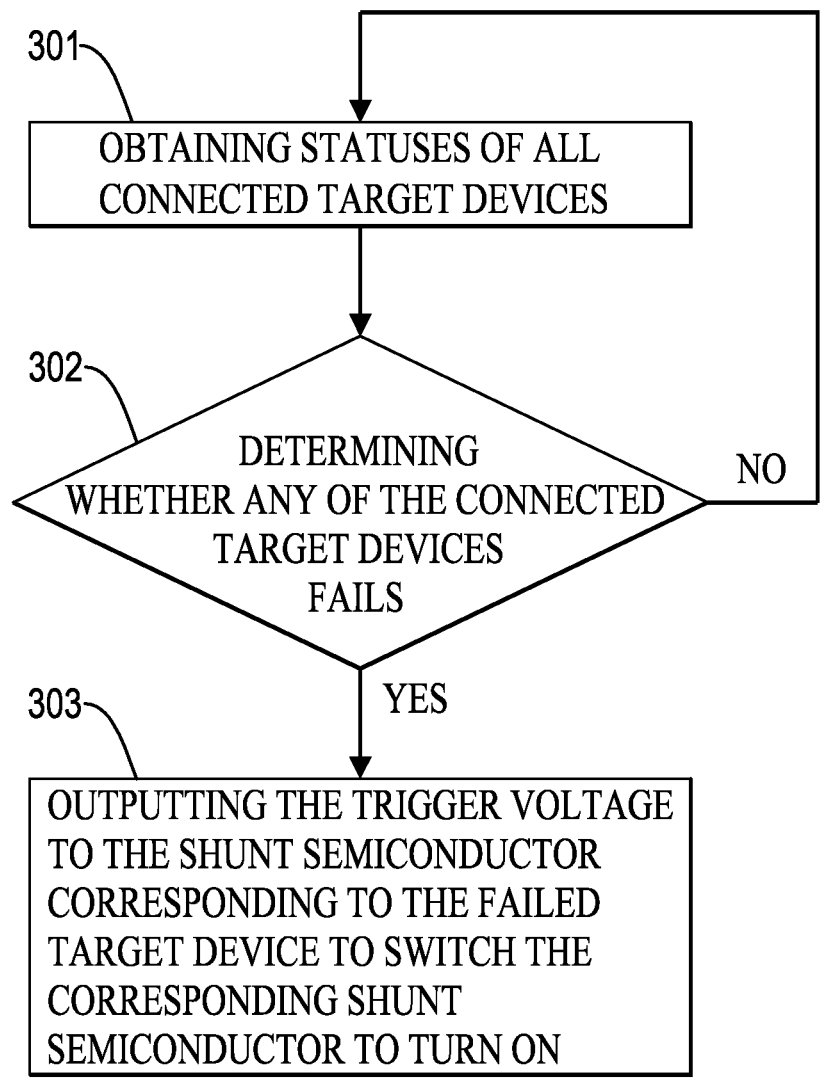
FIG. 3 is a flow chart of an operating process executed by a control unit shown in FIG. 2.

With further reference to FIG. 3, an operating process executed by the control unit 13 comprises steps of obtaining statuses of all connected target devices 301, determining whether any of the connected target devices fails 302 and outputting the trigger voltage to the shunt semiconductor corresponding to the failed target device to switch the corresponding shunt semiconductor to turn on 303.

In the step of obtaining statuses of all connected target devices 301, the target device detector 131 obtains the statuses of all connected target devices.

In the step of determining whether any of the connected target devices fails 302, the target device detector 131 determines whether any of the connected target devices fails.

Figure 4:
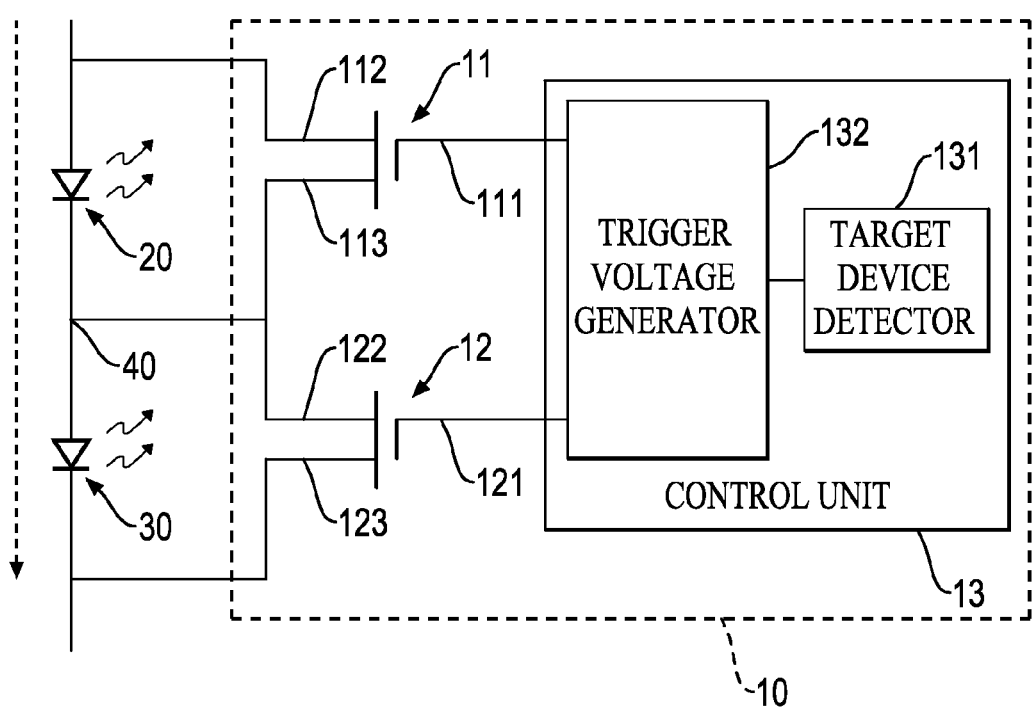
FIG. 4 is a functional block diagram showing a route of a current flowing through LEDs in FIG. 2.

If none of the connected target devices fail, the control unit 13 re-executes the step of obtaining statuses of all connected target devices 301 to repeat the operating process. In the above-mentioned embodiment, with reference to FIG. 4, when all connected LEDs 20, 30 operate normally, the target device detector 131 detects that none of the connected LEDs 20, 30 fail so the trigger voltage generator 132 do not output the trigger voltage and the first and the second shunt semiconductors 11, 12 will not be switched to turn on and remain the status of turning off.

If the target device detector 131 detects that any of the connected target devices fails, the control unit 13 executes the step of outputting the trigger voltage to the shunt semiconductor corresponding to the failed target device to switch the corresponding shunt semiconductor to turn on 303 to output the trigger voltage from the voltage generator 132 to the shunt semiconductor 11, 12 corresponding to the failed target device. In the following descriptions, FIGS. 5 and 6 are exemplified to explain the step 303 by using the above-mentioned embodiment.

Figure 5:
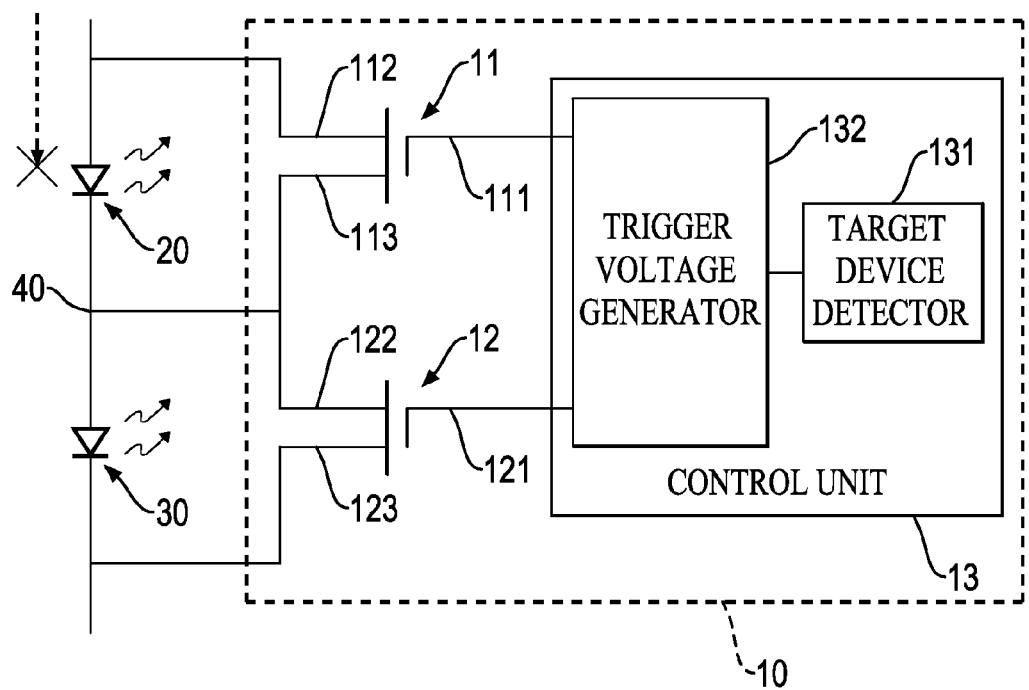
FIG. 5 is a functional block diagram showing that the current cannot flow through a failed LED.

With further reference to FIG. 5, when the target device detector 131 detects that one of the connected LEDs 20, 30 fails, for example the first LED 20 fails, the trigger voltage generator 132 outputs the trigger voltage to the first shunt semiconductor 11, which corresponds to the failed first LED 20. Upon the moment that the first LED 20 just fails, the electrical potential difference between the anode of the first LED 20 and the cathode of the second LED 30 will be raised sharply so the trigger voltage is raised too. The trigger voltage is greater than a threshold of the MOS so the first shunt semiconductor 11 subsequently turns on and operates in the saturation mode. In this state, current is allowed to flow through the shunt terminals of the first shunt semiconductor 11.

Figure 6:
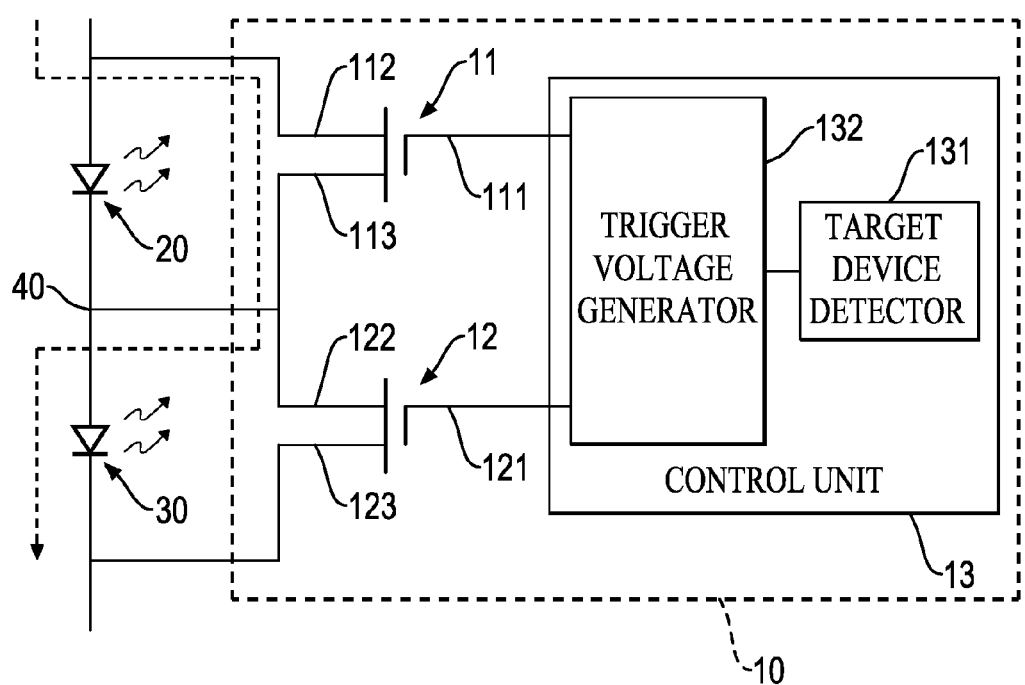
FIG. 6 is a functional block diagram showing a shunt route through the shunt protection module in accordance with the present invention when one of corresponding LEDs fails.
Figure 7:
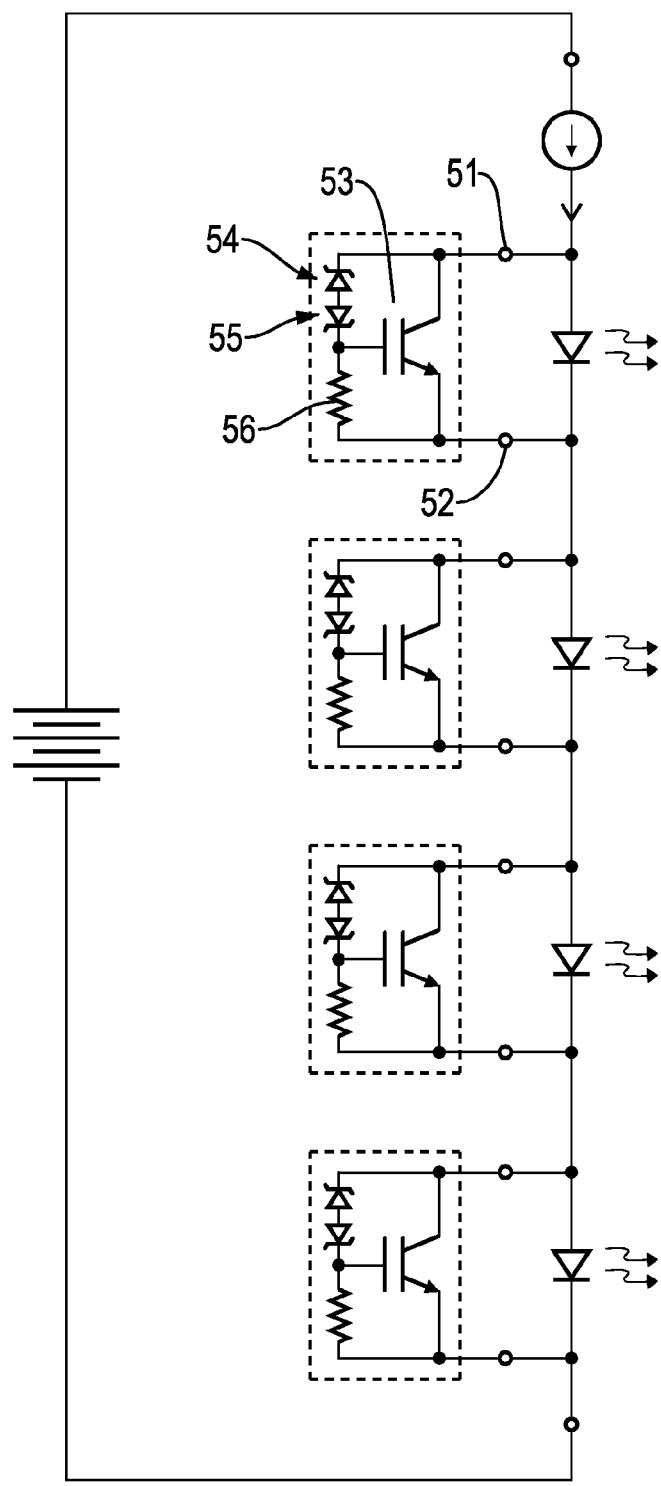
FIG. 7 is a circuitry of a conventional shunt protection circuit.
Figure 8:
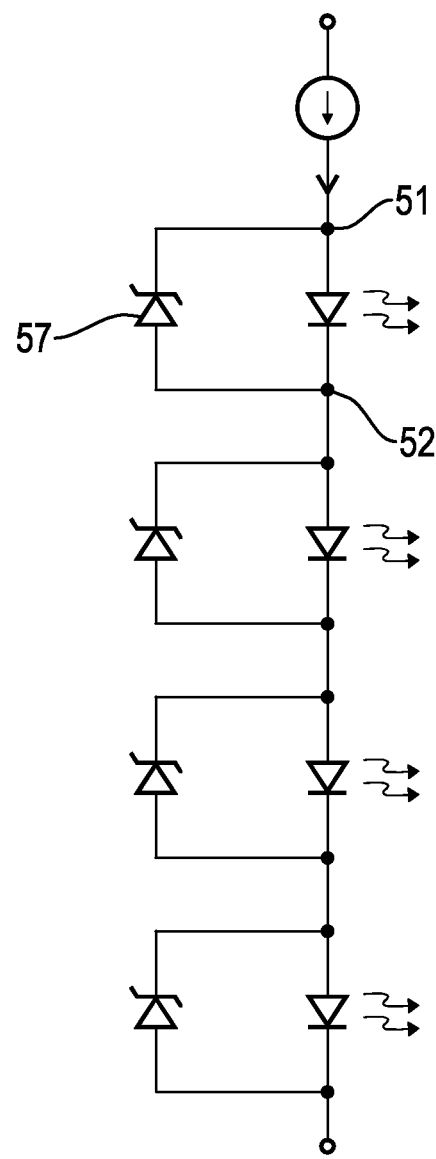
FIG. 8 is a circuitry of another conventional shunt protection circuit.

With reference to FIG. 6, after the first shunt semiconductor 11 turns on, the current originally flowing through the first LED 20 flows through the shunt terminal 112, the first shunt semiconductor 11, the shunt terminal 113, the node 40 and the second LED 30. The LED string remains operating normally because the first shunt semiconductor 11 provides a shunt route. Even though only the second LED 30 operates normally after the first LED 20 fails, the first shunt semiconductor 11 still remains turning on because a forward voltage of the second LED 30 is 3.5 volts so the control unit 13 outputs the 3.5-volts of trigger voltage.

According to the characteristic of the MOS, when the MOS operates in the saturation mode, the electrical potential difference between the drain and source terminals of the MOS is very low. For example, if a 100-milliampere (mA) current flows through the MOS, the electrical potential difference between the drain and source terminals of the MOS is about 0.1 volts. Therefore, a power dissipation of the first shunt semiconductor 11 is 0.01 watts when the first LED 20 fails and the first shunt semiconductor 11 turns on.

Based on the foregoing descriptions, because each shunt semiconductor has characteristic that with the higher voltage the trigger terminal 111 is input, the lower the electrical potential difference between the shunt terminals 112, 113 is, and the control unit 13 outputs the trigger voltage that is equal to the electrical potential difference on at least two adjacent target devices to the shunt semiconductor corresponding to the failed target device, an electrical potential difference on the shunt semiconductor is low when it operates. Therefore, the shunt protection module and method of the present invention ensure providing high trigger voltage to the shunt semiconductor corresponding to the failed target device so the power dissipation of the shunt protection module of the present invention can be reduced as low as possible.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A shunt protection module for series connected devices being adapted to connect to multiple target devices connected in series, and the shunt protection module comprising:

multiple shunt semiconductors corresponding respectively to the target devices, and each shunt semiconductor having a trigger terminal and two shunt terminals, connecting to a corresponding target device in parallel with the shunt terminals and having a characteristic that with the higher a voltage that is input to the trigger terminal, the lower an electrical potential difference between the shunt terminals is; and a control unit being capable of outputting a trigger voltage that is equal to an electrical potential difference on at least two adjacent target devices, connecting to the trigger terminals of the shunt semiconductors, detecting whether any of the target devices fails and outputting the trigger voltage to the shunt semiconductor corresponding to the failed target device to switch the corresponding shunt semiconductor to turn on.

2. The module as claimed in claim 1, wherein the control unit comprises a target device detector detecting whether any of the target devices fails; and a trigger voltage generator connecting to the target device detector and the trigger terminals of the shunt semiconductors, and the trigger voltage generator outputting the trigger voltage to the shunt semiconductor corresponding to the failed target device to switch the corresponding shunt semiconductor to turn on when the target device detector detects that any of the target devices fails.

3. The module as claimed in claim 1 being adapted to connect to a first target device and a second target device, and each target device having an input and an output, and the output of the first target device connecting to the input of the second target device at a node, wherein a first shunt semiconductor and a second semiconductor are implemented;

the first shunt semiconductor corresponds to the first target device and has
   a trigger terminal; and
   two shunt terminals connecting respectively to the input of the first target device and the node;

the second shunt semiconductor corresponds to the second target device and has
   a trigger terminal; and
   two shunt terminals connecting respectively to the node and the output of the second target device; and the control unit is capable of outputting a trigger voltage that is equal to an electrical potential difference between the input of the first target device and the output of the second target device, connects to the trigger terminals of the first and the second shunt semiconductors, detects whether any of the first and the second target devices fails and outputs the trigger voltage to the shunt semiconductor corresponding to the failed target device to switch the corresponding shunt semiconductor to turn on.

4. The module as claimed in claim 2, being adapted to connect to a first target device and a second target device, and each target device having an input and an output, and the output of the first target device connecting to the input of the second target device at a node, wherein a first shunt semiconductor and a second semiconductor are implemented;

the first shunt semiconductor corresponds to the first target device and has
   a trigger terminal; and
   two shunt terminals connecting respectively to the input of the first target device and the node;

the second shunt semiconductor corresponds to the second target device and has
   a trigger terminal; and
   two shunt terminals connecting respectively to the node and the output of the second target device; and the control unit is capable of outputting a trigger voltage that is equal to an electrical potential difference between the input of the first target device and the output of the second target device, connects to the trigger terminals of the first and the second shunt semiconductors, detects whether any of the first and the second target devices fails and outputs the trigger voltage to the shunt semiconductor corresponding to the failed target device to switch the corresponding shunt semiconductor to turn on.

5. The module as claimed in claim 1, wherein
   each shunt semiconductor is a metal oxide semiconductor (MOS);
   the trigger terminal is a gate terminal of the MOS; and
   the shunt terminals respectively are a drain terminal and a source terminal of the MOS.

6. The module as claimed in claim 2, wherein
   each shunt semiconductor is a MOS;
   the trigger terminal is a gate terminal of the MOS; and the shunt terminals respectively are a drain terminal and a source terminal of the MOS.

7. The module as claimed in claim 3, wherein
each shunt semiconductor is a MOS;
the trigger terminal is a gate terminal of the MOS; and
the shunt terminals respectively are a drain terminal and a source terminal of the MOS.

8. The module as claimed in claim 4, wherein
each shunt semiconductor is a MOS;
the trigger terminal is a gate terminal of the MOS; and
the shunt terminals respectively are a drain terminal and a source terminal of the MOS.

9. A shunt protection method for series connected devices being executed by a control unit and comprising steps of:
connecting at least two shunt semiconductors respectively to at least two target devices connected in series, and each of the at least two shunt semiconductors having a trigger terminal and two shunt terminals, connecting to a corresponding target device in parallel with the shunt terminals and having a characteristic that with the higher a voltage that is input to the trigger terminal, the lower an electrical potential difference between the shunt terminals is;
obtaining statuses of all connected target devices;
detecting whether any of the connected target devices fails; and
outputting a trigger voltage that is equal to an electrical potential difference on at least two adjacent target devices to the shunt semiconductor corresponding to the failed target device to switch the corresponding shunt semiconductor to turn on when any of the connected target devices fails.

10. The method as claimed in claim 9 re-executing the step of obtaining statuses of all connected target devices if none of the connected target devices fails.

* * * * *